United States Patent
Corbett et al.

[11] 3,856,788
[45] Dec. 24, 1974

[54] DYESTUFF AND METHOD OF MAKING AND USING SAME

[75] Inventors: John Frank Corbett, Glenview, Ill.; Allen G. Fooks, Filehurst, Reading, England

[73] Assignee: The Gillette Company, Boston, Mass.

[22] Filed: June 26, 1972

[21] Appl. No.: 266,249

Related U.S. Application Data

[62] Division of Ser. No. 135,495, April 19, 1971, abandoned.

[52] U.S. Cl............... 260/244 R, 6/10, 6/54, 6/177 R
[51] Int. Cl............................................. C09b 19/00
[58] Field of Search................................... 260/244

[56] References Cited
UNITED STATES PATENTS
255,349  3/1882  Stebbins............................ 260/244
404,309  5/1889  Schmid.............................. 260/244

Primary Examiner—Harry I. Moatz

[57] ABSTRACT

3,7-Diaminophenoxazinium salts having the formula:

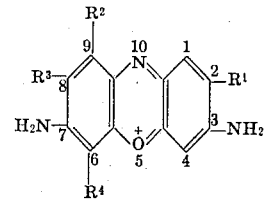

in which $R^1$ is an alkyl group having from 1 to 4 carbon atoms, $R^2$, $R^3$ and $R^4$, which may be the same or different, are hydrogen, chlorine, bromine or an alkyl group having from 1 to 4 carbon atoms and $X^-$ is an anion, are useful blue-violet dyes for dyeing hair, wool and other keratin materials, and polyacrylonitrile fibers. They are made by oxidizing in solution a mixture of a p-phenylenediamine and an aminoalkylphenol, or by condensing an N,N'-dichloro-p-benzoquinonediimine with the aminoalkylphenol.

4 Claims, No Drawings

DYESTUFF AND METHOD OF MAKING AND USING SAME

This application is a division of application Ser. No. 135,495 filed Apr. 19, 1971 now abandoned.

This invention is concerned with a novel class of phenoxazine derivatives, with processes for the preparation of the new compounds, and with compositions containing them.

We have found that 3,7-diaminophenoxazinium salts of the formula:

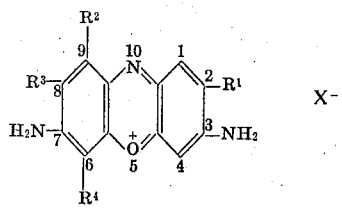

in which $R^1$ is an alkyl group having from 1 to 4 carbon atoms, $R^2$, $R^3$ and $R^4$, which may be the same or different, are hydrogen, chlorine, bromine or an alkyl group having from 1 to 4 carbon atoms and $X^-$ is an anion, are useful blue-violet dyes for dyeing hair, wool and other keratin materials, and polyacrylonitrile fibers.

These salts are novel and constitute one aspect of the present invention.

Preferred salts are those in which the anion is $Cl^-$, $Br^-$ and $HSO_4^-$.

The invention also comprises a process for the preparation of the novel salts, which comprises oxidizing a mixture of a p-phenylenediamine of the formula:

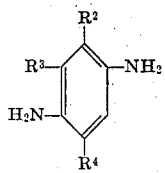

in which $R^2$, $R^3$ and $R^4$ have the above-stated meanings, and a 3-amino-4-alkyl-phenol of the formula:

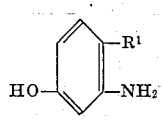

in which $R^1$ has the above-stated meaning, in the presence of an inert solvent in which both reactants are dissolved, oxidation being effected by an oxidizing agent which is soluble in said solvent.

Suitable p-phenylenediamine starting materials include, for example, p-phenylenediamine, 2,5-diaminotoluene, 2,5-diamino-1,4-xylene, 2,5-diamino-1,3-xylene, 2,5-diamino-1,2-xylene, 2,5-diaminochlorobenzene, 2,5-diaminobromobenzene, 2,5-diamino-1,4-dichlorobenzene, 2,5-diamino-1,3-dichlorobenzene, 2,5-diamino-4-chlorotoluene and 2,5-diaminocumene. Suitable 3-amino-4-alkyl-phenols include, for example, 3-amino-4-methyl-phenol and 3-amino-4-isopropyl-phenol. Advantageously the p-phenylenediamine and 3-amino-4-alkyl-phenol starting materials are used in equimolar proportions and in as high a concentration as possible in the solvent. However, an excess of either material may be used at the cost of wasting the excess unless it is recovered, and lower concentrations can be used if desired. Either or both of the starting materials may be introduced into the solution in the form of its salt of an acid having the same anion $X^-$ as is desired in the salt product. Alternatively the acid or a soluble neutral inorganic salt containing the desired anion may be introduced separately into the solution in an amount at least equivalent to the lesser of the two starting materials. When the free p-phenylenediamine material is used, it may require the addition of an acid such as hydrochloric, hydrobromic or sulfuric to achieve dissolution. Once there has been prepared a 3,7-diaminophenoxazinium salt of any anion, it can be converted into a salt of any other anion by conventional ion exchange reactions.

The preferred solvents for this reaction are water and mixtures of water and a water-soluble alcohol or ketone, the mixture containing up to 20% by weight, based on the total weight of the solvents, of the alcohol or ketone. Such solvents are inert to the reagents. Suitable alcohols and ketones include methyl alcohol, n-propyl alcohol, isopropyl alcohol, tertiary butyl alcohol, acetone, and methyl ethyl ketone. Suitable oxidizing agents are, for example, ferricyanide, dichromate and permanganate salts, of which the first is preferred, the most commonly available soluble salts including, for example, the ammonium, sodium, potassium, lithium, calcium, and strontium salts. Unless special steps are taken to exclude oxygen from the reaction system, including dissolved oxygen present in the solvent used, such adventitious oxygen takes part in the oxidation reaction and reduces the requirement for the oxidizing agent. Thus while it is necessary to use at least 6 moles of soluble ferricyanide per mole of p-phenylenediamine when all oxygen is excluded from the reaction system and the reaction is carried out under a non-oxidizing atmosphere, nevertheless, if oxygen is not excluded and the reaction is carried out in air, then satisfactory yields of the desired product are generally obtained with only 4 moles of ferricyanide per mole of p-phenylenediamine.

The reaction is preferably commenced at room temperature and concluded at elevated temperatures, for example of from 80° to 100°C; heating is generally effected for from 5 to 60 minutes, and preferably for 30 minutes. Heating for somewhat longer time periods or at somewhat higher temperatures is not harmful, but unnecessary. Failure to heat merely makes the time required for the reaction undesirably long. The pH of the reaction mixture is suitably from 4 to 10, and is preferably from 8 to 9.

The present invention further comprises a process for the preparation of the novel salts, in which $X^-$ is $Cl^-$, which comprises condensing an N,N'-dichloro-p-benzoquinonedi-imine of the formula:

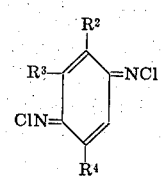

in which $R^2$, $R^3$ and $R^4$ have the above-stated meanings, with a 3-amino-4-alkyl-phenol of the formula:

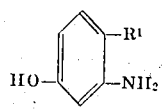

in which R¹ has the above-stated meaning by heating a solution containing said reactants dissolved in a solvent inert to the reactants.

Suitable solvents for this reaction are, for example aliphatic alcohols containing up to 4 carbon atoms, such as methyl alcohol, ethyl alcohol, n-propyl or isopropyl alcohol, n-butyl or isobutyl alcohol. The reaction is preferably carried out at an elevated temperature, and advantageously at a temperature no higher than the reflux temperature of the solvent employed. Although the reaction can be carried out at lower temperatures such as room temperature, it requires an undesirably long time for completion under these conditions. Although the relative proportions of the imine and of the phenol compounds may vary, it is preferred to use approximately equimolar proportions to avoid wasting any excess of one or the other. The concentration of these reagents in the solvent is not critical; usually as high a concentration as can be dissolved is preferred. The phenol compound can be introduced into the solution in the form of its hydrochloride salt, if desired.

As stated above, the compounds according to the invention are useful for dyeing hair, wool and polyacrylonitrile fibers in blue-violet shades and for this purpose aqueous solutions of the compounds are used.

For the dyeing of hair, the novel compounds are preferably formulated in compositions containing one or more of a surfactant, a thickener, a buffer salt and an oxidative dye precursor. Suitable surfactants are, for example, cationic surfactants, such as hexadecyl trimethylammonium bromide, cetyl pyradinium chloride, distearyldimethylammonium chloride and cetyltrimethylammonium chloride; and nonionic surfactants, such as polyethoxylated alkylphenols.

Suitable thickeners include, for example, fatty alcohols, such as cetyl alcohol and stearyl alcohol; fatty acid alkanolamides, such as lauric diethanolamide; nonionic cellulose derivatives; and polyethylene oxide polymers and copolymers of ethylene oxide and propylene oxide.

Suitable buffer salts include, for example, ammonium hydroxide, ammonium sulphate, sodium carbonate and sodium phosphate.

Oxidative dye precursors are organic compounds which, on oxidation with hydrogen peroxide, produce dyes. Suitable compounds of this type include, for example, diaminobenzenes, aminophenols and dihydroxybenzenes.

In order that the invention may be more fully understood, the following examples are given by way of illustration only.

EXAMPLE 1

3.62 g. of p-phenylenediamine dihydrochloride and 3.19 g. of 3-amino-4-methyl-phenol hydrochloride were dissolved in 50 ml. of water and the solution was added, with stirring, to a solution of 27 g. of potassium ferricyanide in 300 ml. of water, the pH being maintained at 8-9 by the addition of ammonia. The mixture was heated on a boiling water bath for 30 minutes and salt was added during cooling to precipitate 3.3 g. of 2-methyl-3,7-diaminophenoxazinium chloride as a dark purple-brown solid.

This product was further purified by dissolution in hot 0.5 M. hydrochloric acid and adding to the filtered solution, sufficient 20% aqueous sodium hydroxide to bring the pH to 8.5. The product was then obtained as black needles with a green reflux; m.p. >300°C.; visible spectrum shows maxima at 554 (shoulder) and 592.

| | | | |
|---|---|---|---|
| Found | C, 59.5; | H, 4.7; | Cl, 13.5% |
| Calc. | C, 59.7; | H, 4.6; | Cl, 13.6% for $C_{13}H_{12}NO_3Cl$ |

EXAMPLE 2

The procedure of Example 1 was followed using 3.62 g. of p-phenylenediamine dihydrochloride and 3.75 g. of 3-amino-4-isopropyl-phenol hydrochloride, to give a 60% yield of 2-isopropyl-3,7-diaminophenoxazinium chloride; the visible spectrum shows maxima at 554 (shoulder) and 591.

This product was converted to the sulphate by dissolution in hot 1.0 M. sulphuric acid and salting out with sodium sulphate.

EXAMPLE 3

The procedure of Example 1 was followed using 1.05 g. of 2,5-diamino-1,4-xylene dihydrochloride, 0.8 g. of 3-amino-4-methyl-phenol hydrochloride and 6.6 g. of potassium ferricyanide. A 60% yield of 2,6,9-trimethyl-3,7-diaminophenoxazinium chloride was obtained; the visible spectrum shows maxima at 552 (shoulder) and 591.

EXAMPLE 4

The procedure of Example 3 was followed using 2,5-diamino-1,3-xylene dihydrochloride in place of 2,5-diamino-1,4-xylene dihydrochloride to give a 55% yield of 2,6,8-trimethyl-3,7-diaminophenoxazinium chloride; the visible spectrum shows maxima at 553 (shoulder) and 593.

EXAMPLE 5

The procedure of Example 1 was followed using 0.72 g. of 2,5-diamino-chlorobenzene, 0.8 g. of 3-amino-4-methylphenol hydrochloride, and 6.6 g. of potassium ferricyanide. A compound of the formula

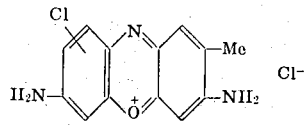

was obtained in 64% yield; the visible spectrum of this compound showed maxima at 550 (shoulder) and 591.

EXAMPLE 6

0.88 g. of N,N-dichloro-p-benzoquinonedi-imine and 0.8 g. of 3-amino-4-methyl-phenol hydrochloride were heated at reflux in 60 ml. of industrial methylated spirit (ethyl alcohol denatured with methyl alcohol) for 20 minutes. The alcohol was evaporated and the residue was dissolved in water and the pH adjusted to 8.5 by the addition of ammonia. 2-Methyl-3,7- diaminophenoxazinium chloride was salted out in 70% yield.

EXAMPLE 7

An aqueous dyeing solution consisting of:
0.5% of 2-methyl-3,7-diaminophenoxazinium chloride
2.0% of hexadecyl trimethylammonium bromide
97.5% of water
was prepared and applied to a tress of blond human hair. After 10 minutes at about 20°C. the hair was rinsed with water; the hair had a strong violet coloration.

Example 8

The following aqueous solutions were prepared:
A. Hexadecyl trimethylammonium bromide 2%
p-Phenylenediamine 0.5%
Resorcinol 0.2%
p-Aminophenol 0.1%
2-Methyl-3,7-diaminophenoxazinium chloride 0.1%
B. Hydrogen peroxide 5%

Solutions A and B were mixed in approximately equal proportions to give a bath of pH 7, and applied immediately to a tress of 50% grey hair. After 20 minutes at about 20°C., the hair was rinsed and allowed to dry. The hair was thus dyed to a rich dark brown color.

EXAMPLE 9

An aqueous dye bath containing:
0.1% of 2-methyl-3,7-diaminophenoxazinium chloride
0.2% of acetic acid
was prepared and heated to 60°C. Bleached woollen yarn was introduced at a bath ratio of 1:100 (i.e. 1 part by weight of yarn per 100 parts by weight of bath). The temperature was raised to 100° over a period of 30 minutes and maintained at that temperature for 1 hour. The yarn was removed, rinsed with cold water and dried. The wool was thus dyed to a fast dull purple shade.

EXAMPLE 10

"Orlon" (polyacrylonitrile) yarn was dyed as described in Example 9 to give a fast bright violet shade.

What is claimed is:
1. A process for the preparation of a 3,7-diaminophenoxazinium salt of the formula

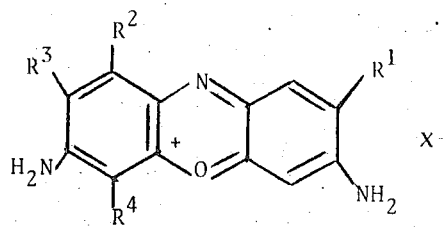

in which $R^1$ is an alkyl group having from 1 to 4 carbon atoms, $R^2$, $R^3$ and $R^4$, which may be the same or different, are selected from the group consisting of hydrogen, chlorine, bromine and an alkyl group having from 1 to 4 carbon atoms, and X is an anion, which process comprises preparing a solution containing dissolved in a solvent inert to the reactants a mixture of a p-phenylenediamine of the formula

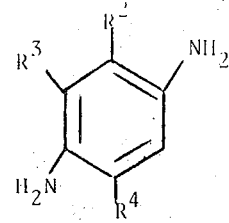

in which $R^2$, $R^3$ and $R^4$ have the meanings specified above, 3-amino-4-alkyl-phenol of the formula

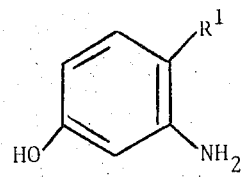

in which $R^1$ has the meaning specified above, and an oxidizing agent selected from the group consisting of ferricyanides, dichromates and permanganates, heating said solution to cause oxidation to occur, then separating the product from the solution.

2. A process according to claim 1 in which the solvent is selected from the group consisting of water and mixtures of water with a water-soluble alcohol or ketone, said mixture containing up to 20% by weight of the alcohol or ketone.

3. A process according to claim 2 in which the oxidizing agent is a ferricyanide salt.

4. A process according to claim 3 in which at least 4 moles of ferricyanide are used per mole of the p-phenylenediamine.

* * * * *